(12) United States Patent
Yamada (10) Patent No.: US 8,783,312 B2
(45) Date of Patent: Jul. 22, 2014

(54) PNEUMATIC TIRE (75) Inventor: Hiroshi Yamada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 295 days.

(21) Appl. No.: 13/323,858

(22) Filed: Dec. 13, 2011

(65) Prior Publication Data
US 2012/0145295 A1 Jun. 14, 2012

(30) Foreign Application Priority Data

Dec. 14, 2010 (JP) ................. 2010-278344

(51) Int. Cl.
*B60C 11/11* (2006.01)
*B60C 11/12* (2006.01)
*B60C 11/13* (2006.01)

(52) U.S. Cl.
USPC ............ 152/209.18; 152/209.22; 152/209.27; 152/DIG. 3

(58) Field of Classification Search
USPC ............ 152/209.18, 209.21, 209.22, 209.27, 152/DIG. 3
See application file for complete search history.

(56) References Cited

U.S. PATENT DOCUMENTS

| | | | | |
|---|---|---|---|---|
| 4,296,789 A | * | 10/1981 | Roberts et al. | 152/209.18 |
| 5,733,393 A | * | 3/1998 | Hubbell et al. | 152/209.5 |
| 5,909,756 A | * | 6/1999 | Miyazaki | 152/209.18 |
| 6,142,200 A | * | 11/2000 | Feider et al. | 152/209.14 |
| 7,422,043 B2 | * | 9/2008 | Miyazaki | 152/209.22 |
| 2008/0236714 A1 | * | 10/2008 | Kojima | 152/209.9 |

FOREIGN PATENT DOCUMENTS

| | | | |
|---|---|---|---|
| EP | 0788898 | * | 8/1997 |
| JP | 7-186626 A | | 7/1995 |

OTHER PUBLICATIONS

English machine translation of JP07-186626, dated Jul. 1995.*
English machine translation of EP0788898, dated Aug. 1997.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire comprises a tread portion divided into a crown land region, two middle land regions and two shoulder land regions. The crown land region and middle land regions are each divided into triangular blocks by axial grooves arranged in a zigzag fashion. The shoulder land regions are each divided into shoulder blocks by axial grooves extending at an angle of not less than 70 degrees. The shoulder block is subdivided into an axially inner part and an axially outer part by a secondary groove extending at an angle of not more than 10 degrees. The outer part is provided with sipes extending at an angle of not less than 70 degrees, each angle with respect the circumferential direction.

11 Claims, 6 Drawing Sheets

PNEUMATIC TIRE

BACKGROUND OF THE INVENTION

The present invention relates to a pneumatic tire, more particularly to a tread pattern suitable for passenger car tires capable of improving on-the-snow performance, without sacrificing steering stability on dry pavement.

Figure 6:
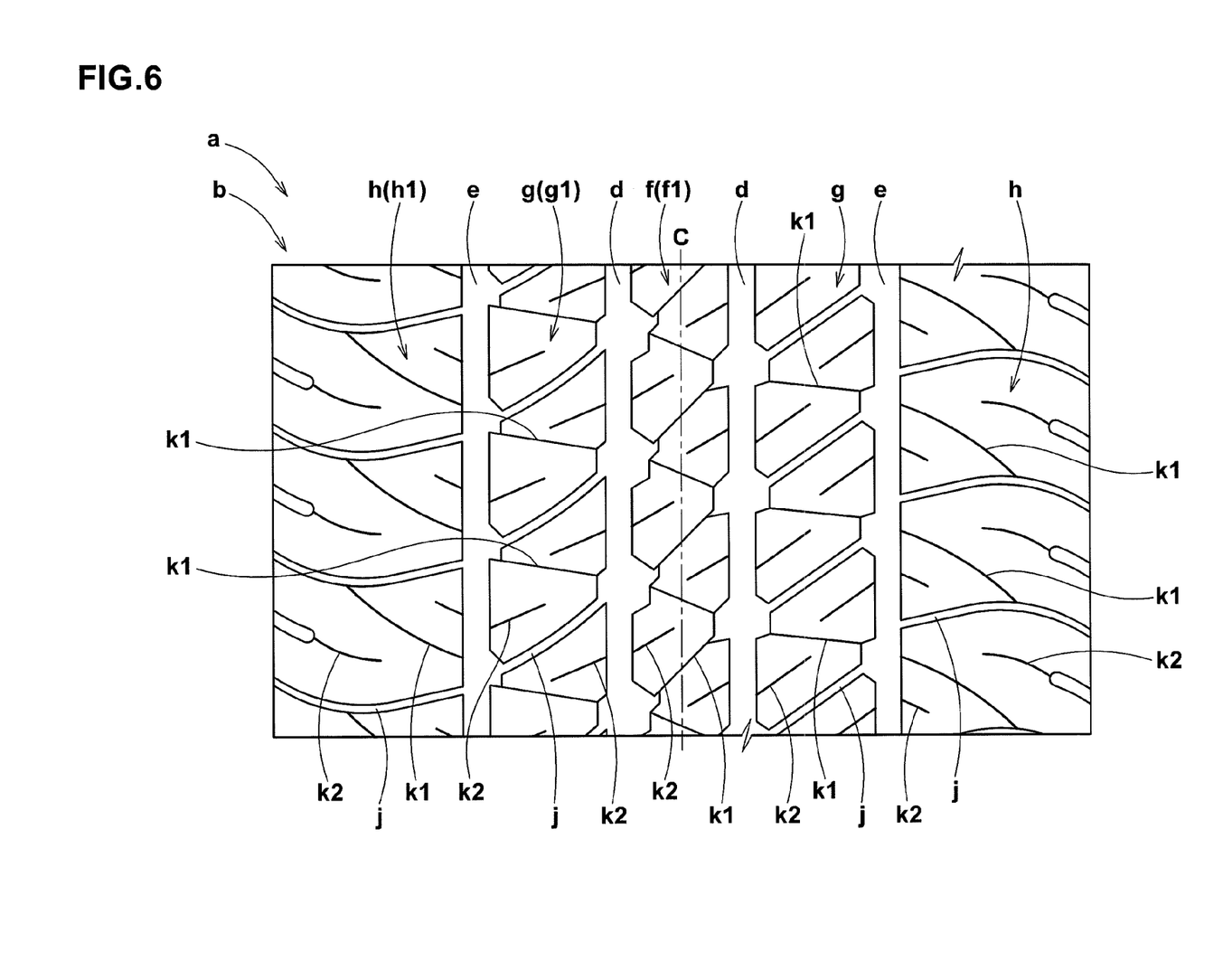
FIG. 6 is a developed view of a part of the tread portion of a tire used in the undermentioned comparative test.

In order to improve on-the-snow performance without sacrificing steering stability on dry pavement, a pneumatic tire (a) having a tread pattern shown in FIG. 6 has been proposed in Japanese Patent Application Publication JP-H07-186626.

The tread portion (b) of this pneumatic tire (a) is provided with a pair of crown main grooves (d) and a pair of shoulder main groove (e) so as to divide the tread portion (b) into a crown land region (f), a pair of middle land regions (g), and a pair of shoulder land regions (h).

The crown land region (f), middle land regions (g) and shoulder land regions (h) are divided into a plurality of blocks (f1, g1 and h1) by narrow grooves (j) and sipes (k1) which are inclined with respect to the circumferential direction.

Each of the blocks (f1-h1) is provided with a sipe (k2) inclined with respect to the tire circumferential direction.

Therefore, by the edges of the sipes (k1 and k2), on-the-snow performance of the pneumatic tire (a) can be improved, but the decrease in the rigidity of the land regions (f-h) is little since the width of the sipes is very narrow, therefore, the steering stability on dry pavement is not sacrificed.

In this tread pattern, however, wandering and one-side drifting of the vehicle is liable to occur when running on snowy roads covered with compacted snow.

SUMMARY OF THE INVENTION

It is therefore, an object of the present invention to provide a pneumatic tire, in which on-the-snow performance including anti-wandering and one-side drifting performance can be improved, without sacrificing the steering stability on dry pavement.

According to the present invention, a pneumatic tire comprises a tread portion provided on each side of the tire equator with an axially inner crown main groove and an axially outer shoulder main groove which extend continuously in the tire circumferential direction so as to divide the tread portion into a crown land region between the crown main grooves, a pair of middle land regions between the crown main grooves and the shoulder main grooves, and a pair of shoulder land regions between the shoulder main grooves and tread edges, wherein the crown land region is provided with crown axial grooves which are narrow grooves and/or sipes extending across the entire width of the crown land region and arranged in a zigzag fashion so as to divide the crown land region into a plurality of crown blocks having triangular configurations, the middle land regions are each provided with middle axial grooves which are narrow grooves and/or sipes extending across the entire width of the middle land region and arranged in a zigzag fashion so as to divide the middle land region into a plurality of middle blocks having triangular configurations, the shoulder land regions are each provided with shoulder axial grooves extending across the entire width of the shoulder land region at an angle of not less than 70 degrees with respect to the tire circumferential direction so as to divide the shoulder land region into a plurality of shoulder blocks, the shoulder blocks are each provided with a shoulder secondary groove extending at an angle of not more than 10 degrees with respect to the tire circumferential direction and disposed at a distance of 3 to 15 mm axially outward from the shoulder main groove so as to subdivide the shoulder block into an axially inner part and an axially outer part, and the outer part is provided with shoulder sipes extending at an angle of not less than 70 degrees with respect to the circumferential direction.

Therefore, in the pneumatic tire according to the present invention, as the crown axial grooves and middle axial grooves are arranged in the zigzag fashions, the circumferential component of the groove edges is increased in the tread central region, and thereby on-the-snow performance can be improved. Further, the crown axial grooves and middle axial grooves are relatively narrow in groove width, therefore, the decrease in the rigidity of the crown land region and middle land regions due to the provision of the axial grooves can be minimized, and the deterioration in the steering stability on dry pavement can be prevented.

Since the shoulder secondary grooves are positioned on the tire equator side of the shoulder land regions where, during cornering, the ground pressure becomes relatively high and the ground contacting length becomes relatively long, the circumferential component of the edges of the shoulder secondary grooves functions effectively, and the cornering performance on snowy roads can be improved.

Further, by the shoulder sipes disposed in the axially outer parts of the shoulder blocks, the traction on snowy roads can be greatly increased.

Furthermore, as the angle of the shoulder secondary grooves is set to be at most 10 degrees, the shoulder secondary grooves are substantially parallel with the tire circumferential direction. As a result, wandering and one-side drifting of the vehicle during running on snowy roads can be effectively suppressed.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia),STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The term "tread width TW" is the axial distance between the tread edges Te measured in the normally inflated unloaded condition of the tire. The tread edges Te are the axial outermost edges of the ground contacting patch (camber angle=0) in the normally inflated loaded condition.

The term "sipe" means a groove having a very narrow width which is usually 0.3 to 1.5 mm or a cut having substantially no groove width unless otherwise noted.

DESCRIPTION OF THE PREFERRED EMBODIMENTS

Embodiments of the present invention will now be described in detail in conjunction with the accompanying drawings.

The pneumatic tire according to the present invention comprises a tread portion 2, a pair of sidewall portions, a pair of bead portions, a carcass extending between the bead portions, a tread reinforcing belt disposed radially outside the carcass in the tread portion as usual.

Figure 1:
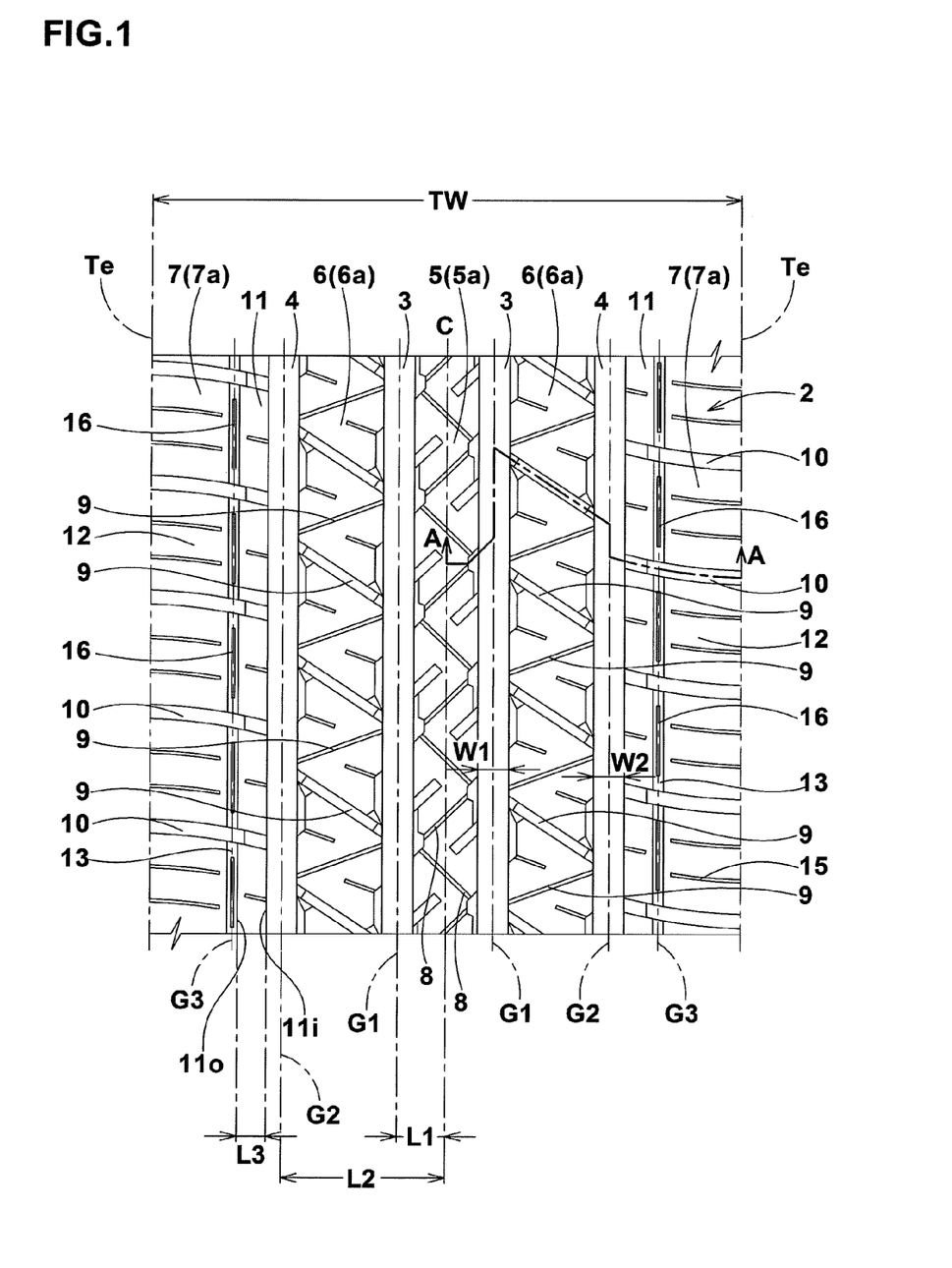
FIG. 1 is a developed view of a part of the tread portion of a pneumatic tire according to an embodiment of the present invention.

The present invention is suitably applied to passenger car tires and the like. FIG. 1 shows the tread portion 2 of such a passenger car tire as an embodiment of the present invention. In the tread portion 2 in this embodiment, by the undermentioned grooves and sipes, there is formed a bidirectional tread pattern which is symmetry with respect to a point on the tire equator c.

The tread portion 2 is provided on each side of the tire equator c with an axially inner crown main grooves 3 and an axially outer shoulder main grooves 4 which extend continuously in the tire circumferential direction so that the tread portion 2 is axially divided into a crown land region 5 between the crown main grooves 3, a pair of middle land regions 6 between the crown main grooves 3 and the shoulder main grooves 4, and a pair of shoulder land regions 7 between the shoulder main grooves 4 and tread edges Te.

Each main groove 3, 4 may be formed in a various configuration such as wavy configuration and zigzag configuration. In this embodiment, however, the crown main grooves 3 and shoulder main grooves 4 are each formed in a straight configuration. The use of such straight grooves 3 and 4 is desirable because vehicle's unstable motions such as wandering when applying brake, drift to one side and the like can be suppressed to provide steering stability.

The width w1 of the crown main grooves 3 and the width w2 of the shoulder main grooves 4 are preferably set in a range of from 3 to 10% of the tread width Tw.

The depth D1 of the crown main grooves 3 and the depth D2 of the shoulder main grooves 4 are preferably set in a range of from 6 to 10 mm.

If the width w1 and w2 and/or depth D1 and D2 exceed the respective upper limits, there is a possibility that the rigidity of the land regions 5, 6 and 7 becomes insufficient. If exceed the respective lower limits, it becomes difficult for the snow packed into the grooves to be self discharged.

The axial distance L1 of the center line G1 of the crown main groove 3 from the tire equator c is preferably set in a range of not less than 3%, more preferably not less than 6%, but not more than 20%, more preferably not more than 16% of the tread width Tw.

The axial distance L2 of the center line G2 of the shoulder main groove 4 from the tire equator C is preferably set in a range of not less than 15%, more preferably not less than 20%, but not more than 40%, more preferably not more than 35% of the tread width Tw.

Therefore, the rigidity balance between the land regions 5-7 is improved to improve the steering stability.

The above-mentioned crown land region 5 is provided with crown axial grooves 8. The crown axial grooves 8 are narrow grooves and/or sipes extending across the entire width of the crown land region 5 and arranged in a zigzag formation so that the crown land region 5 is divided into a plurality of triangular crown blocks 5a.

The middle land region 6 is provided with middle axial grooves 9. The middle axial grooves 9 are narrow grooves and/or sipes extending across the entire width of the middle land region 6 and arranged in a zigzag formation so that the middle land region 6 is divided into a plurality of triangular middle blocks 6a.

The shoulder land region 7 is provided with shoulder axial grooves 10. The shoulder axial grooves 10 extend across the entire width of the shoulder land region 7 so that the shoulder land region 7 is divided into a plurality of shoulder blocks 7a.

In the crown land region 5 and middle land regions 6, therefore, by the crown axial grooves 8 and middle axial grooves 9 arranged in zigzag formations, the circumferential component of the groove edges is greatly increased, and on-the-snow performance can be improved.

Further, as the crown land region 5 and middle land regions 6 are divided into the triangular crown blocks 5a and triangular middle blocks 6a, the rigidity of the blocks 5a and 6a as a whole in the circumferential direction and axial direction is evened, and the rigidity balance between the crown land region 5 and middle land regions 6 is improved. As the crown axial grooves 8 and middle axial grooves 9 are relatively narrow in groove width, the decrease in the rigidity of each land region 5, 6 can be minimized. Accordingly, the steering stability on dry pavement can be effectively maintained.

Figures 3A, 3B:
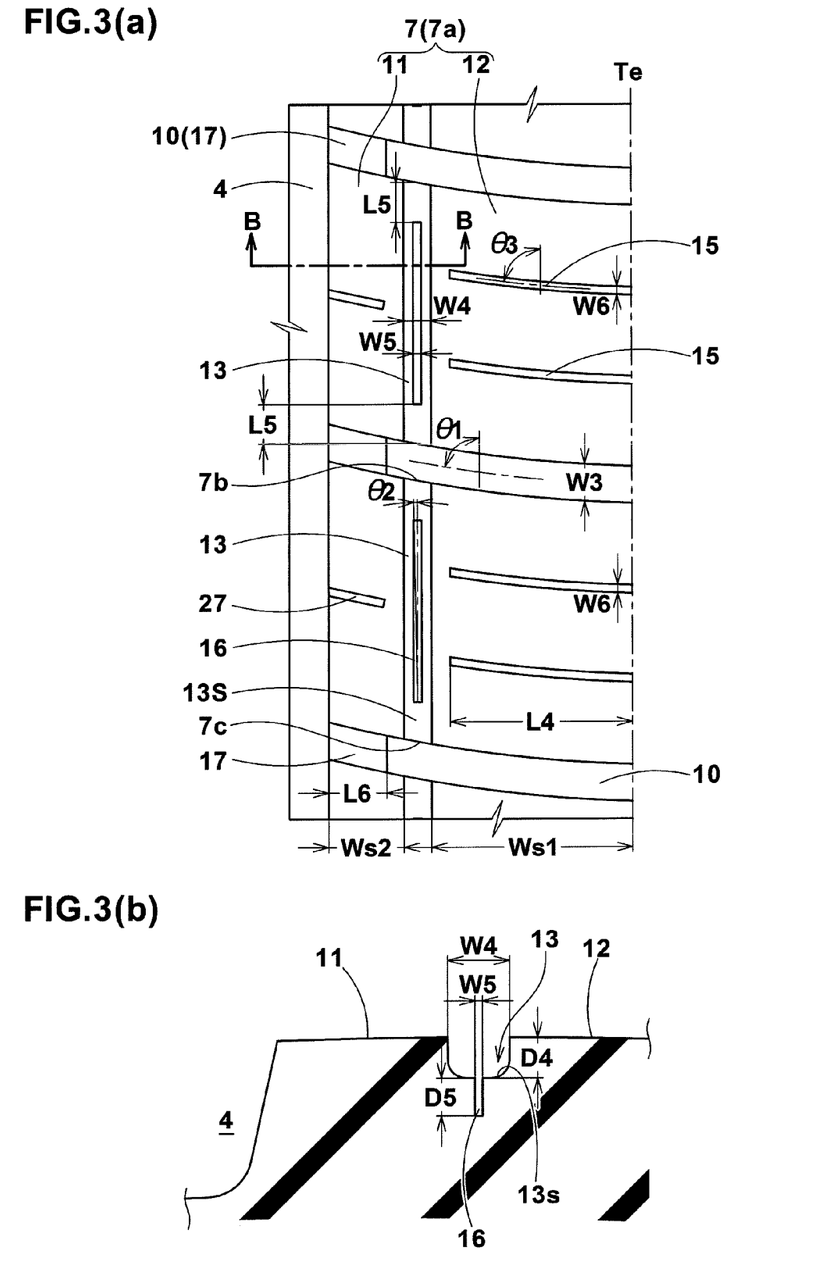
FIG. 3(a) is an enlarged view of a part of the shoulder block row shown in FIG. 1.
FIG. 3(b) is a cross sectional view taken along line B-B in FIG. 3(a).

As shown in FIG. 3(a), the angle θ1 of the shoulder axial groove 10 with respect to the tire circumferential direction is set to be at least 70 degrees, preferably at least than 75 degrees. If the angle θ1 is less than 70 degrees, the lateral stiffness (rigidity) of the shoulder blocks 7a becomes insufficient for the shoulder 1 and region 7 which is subjected to large ground pressure during cornering, and the shearing force of the snow packed into the shoulder axial grooves 10 decreases.

The angle θ1 may be constant along the entire length of the shoulder axial groove 10, but preferably the angle θ1 is gradually increased toward the tread edge Te. Thereby, the lateral stiffness is further increased near the tread edge Te which is subjected to a more large ground pressure during cornering, and the steering stability can be further improved. More preferably, the angle θ1 is set to be not more than 88 degrees in view of the balance between the lateral stiffness (rigidity) of the shoulder block 7a and the cornering performance.

In order to derive the rigidity of the shoulder block 7a and the shearing force of the packed snow in a well balanced manner, the width w3 of the shoulder axial groove 10 is preferably set in a range of not less than 1.0%, more preferably not less than 2.0%, but not more than 8.0%, more preferably not more than 5.0% of the tread width Tw. Further, the depth D3 of the shoulder axial groove 10 is preferably set in a range of not less than 40%, more preferably not less than 50%, but not more than 100%, more preferably not more than 90% of the depth D2 of the shoulder main grooves 4.

Each of the shoulder blocks 7a is provided with a single shoulder secondary groove 13 in order to axially subdivide the shoulder block 7a into an axially inner part 11 and an axially outer part 12.

The angle θ2 of the shoulder secondary groove 13 with respect to the tire circumferential direction has to be at most 10 degrees, preferably not more than 5 degrees, more preferably 0 degree. If the angle θ2 exceed 10 degrees, the circumferential component of the groove edges decreases, and the cornering performance on snowy roads is deteriorated, and it becomes hard to control the wandering and one-side drifting.

The axial distance L3 between the shoulder secondary groove 13 and the shoulder main groove 4 (namely, the axial width of the inner part 11) has to be in a range of not less than 3 mm, preferably not less than 4 mm, more preferably not less than 5 mm, but, not more than 15 mm, preferably not more than 13 mm, more preferably not more than 11 mm.

If the distance L3 is less than 3 mm, the lateral stiffness (rigidity) of the inner part 11 becomes insufficient, and wear tends to concentrate in the inner parts 11. If the distance L3 is more than 15 mm, the lateral stiffness (rigidity) of the outer parts 12 subjected to large ground pressure during cornering is decreased, and the steering stability is deteriorated.

Figure 2:
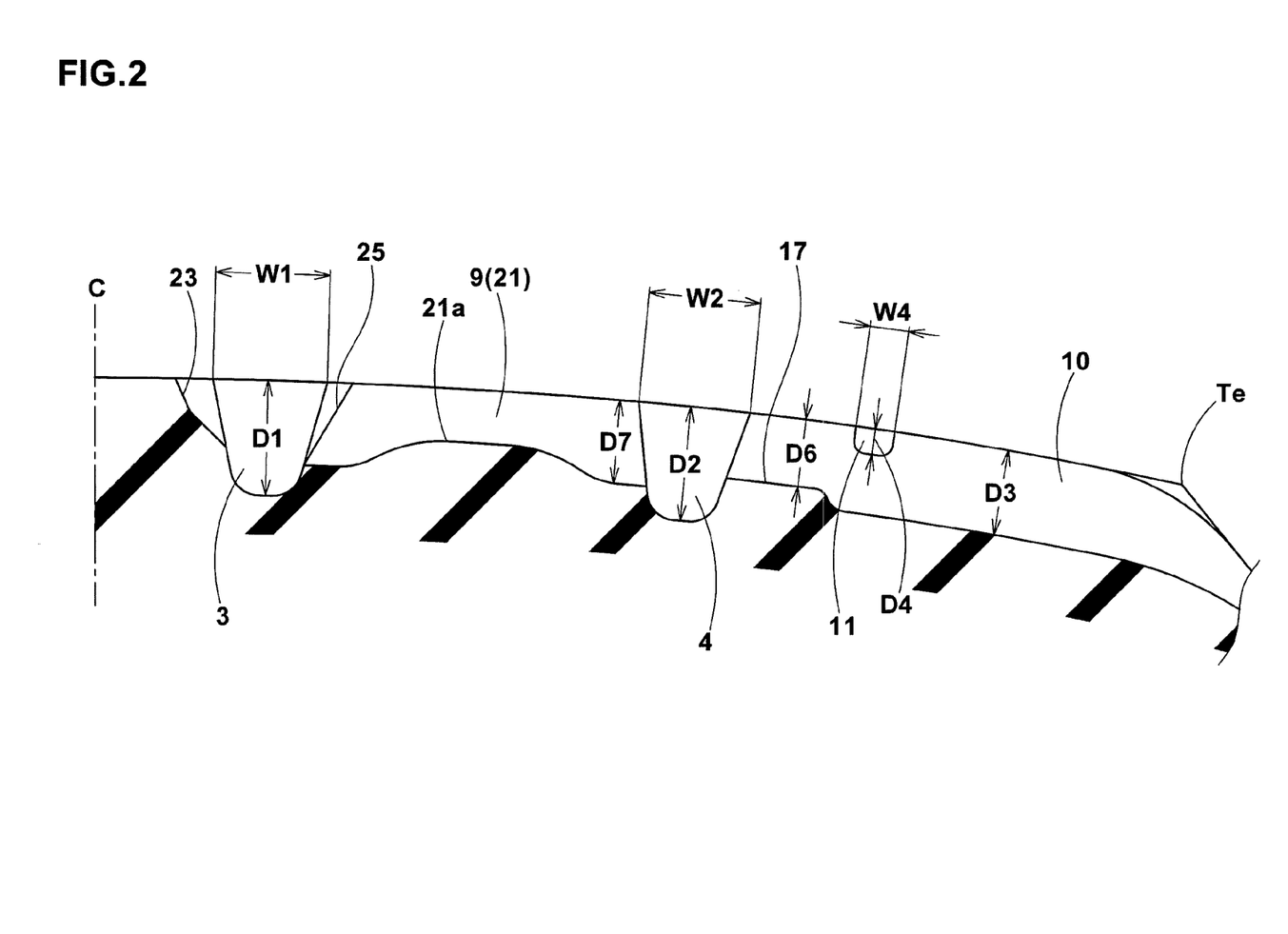
FIG. 2 is a cross sectional view of a tread shoulder portion taken along line A-A of FIG. 1.

As shown in FIG. 2, the depth D4 of the shoulder secondary groove 13 is preferably set in a range of not less than 0.5 mm, more preferably not less than 1.0 mm, but not more than 7.0 mm, more preferably not more than 6.0 mm. Therefore, the rigidity of the shoulder block 7a can be maintained, while achieving self-discharging of snow packed into the shoulder secondary grooves 13, and on-the-snow performance and steering stability on dry pavement can be secured in a well balanced manner.

In order to effectively derive the above-mentioned effects, the depth D4 of the shoulder secondary groove 13 is preferably less than the width w4 of the shoulder secondary groove 13. More specifically, the ratio D4/w4 of the depth D4 to the width w4 is preferably set in a range of not less than 40%, more preferably not less than 50%, but not more than 98%, more preferably not more than 90%.

Preferably, the outer part 12 of each of the shoulder blocks 7a is provided with shoulder sipes 15 extending from the axial outside of the tread edge Te toward the shoulder secondary groove 13 but terminating without reaching thereto.

In this embodiment, two shoulder sipes 15 are formed so as to divide the circumferential dimension of the outer part 12 into three equi-parts.

The shoulder sipes 15 have to extend at an angle θ3 of not less than 70 degrees, preferably not less than 75 degrees with respect to the circumferential direction.

Such shoulder sipes 15 can increase the traction performance during straight running, without excessively decreasing the block rigidity of the outer part 12, therefore, on-the-snow performance can be improved. If the angle θ3 is less than 70 degrees, the effect to improve the traction on snowy roads decreases.

In order to secure the cornering performance on snowy roads and the traction performance during straight running in a well balanced manner, the angle θ3 is preferably set be not more than 88 degrees.

In this embodiment, the angle θ3 of the shoulder sipes 15 is gradually increased toward the tread edge Te. Therefore, the shoulder sipes 15 gradually increase the lateral stiffness (rigidity) toward the tread edge Te, and the cornering performance on snowy roads can be improved.

If the axial length L4 of the shoulder sipes 15 is too long, the rigidity of the outer part 12 is decreased, and there is a possibility that the steering stability on dry pavement is deteriorated. If too short, the edge length becomes insufficient.

The axial length L4 of the shoulder sipe 15 is preferably not less than 50%. more preferably not less than 60%, but not more than 98%, more preferably not more than 95% of the axial width ws1 of the outer part 12.

The groove width w6 of the shoulder sipe 15 is preferably set in a range of not less than 0.2 mm, more preferably not less than 0.3 mm, but not more than 1.5 mm, more preferably not more than 1.2 mm.

It is preferable that the bottom 13s of the shoulder secondary groove 13 is provided with a groove-bottom sipe 16 extending along the shoulder secondary groove 13.

The groove-bottom sipe 16 can provide groove edges in the last stage of tread wear life without excessively decreasing the rigidity of the shoulder block 7a.

In order to secure the rigidity of the shoulder land region 7, the groove-bottom sipe 16 in this embodiment is formed as a straight sipe positioned on the center line G3 of the shoulder secondary groove 13. And preferably, as shown in FIG. 3(a), both ends of the groove-bottom sipe 16 are closed ends which are respectively spaced apart from the circumferential ends 7b and 7c of the shoulder secondary groove 13 by a distance L5 of not less than 1.0 mm, more preferably not less than 2.0 mm, but not more than 8.0 mm, more preferably not more than 6.0 mm. If the distance L5 becomes more than 8.0 mm, as the groove-bottom sipe 16 becomes short accordingly, the edge effect becomes insufficient. If the distance L5 becomes less than 1.0 mm, the shoulder secondary groove 13 is largely opened during cornering, and the inner part 11 and outer part 12 are decreased in the rigidity.

In order to effectively derive the above described advantages, as shown in FIG. 3(b), the width w5 of the groove-bottom sipe 16 is preferably set in a range of not less than 20%, more preferably not less than 30%, but not more than 90%, more preferably not more than 80% of the width w4 of the shoulder secondary groove 13.

Further, the depth D5 of the groove-bottom sipe 16 is preferably set in a range of not less than 20%, more preferably not less than 40%, but not more than 300%, more preferably not more than 250% of the depth D4 of the shoulder secondary groove 13.

In order to increase the apparent stiffness of the shoulder blocks 7a, the shoulder axial groove 10 is preferably provided with a tie bar 17 rising from the bottom of the shoulder axial groove 10 and connecting the adjacent shoulder blocks.

In this embodiment, since the inner part 11 is small, it is preferable that the tie bar 17 is disposed near or adjacently to the shoulder main groove 4 as shown in FIG. 2 and FIG. 3(a). The depth D6 of the shoulder axial groove 10 at the tie bar 17 is preferably set in a range of not less than 20%, more preferably not less than 30%, but not more than 90%, more preferably not more than 80% of the depth D2 of the shoulder main groove 4. The length L6 of the tie bar 17 is preferably set in a range of not less than 30%, more preferably not less than 50%, but not more than 120%, more preferably not more than 100% of the block width w2 of the inner part 11. If the axial length L6 of the tie bar 17 is more than 120%, the shearing force of the snow packed into the shoulder axial grooves 10 decreases.

Further, the inner part 11 may be provided with an inner sipe 27 extending from the shoulder main groove 4 toward the tread edge Te and terminating without reaching to the shoulder secondary groove 13 so as to divide the circumferential dimension of the inner part 11 into two substantially equi-parts.

Figure 4:
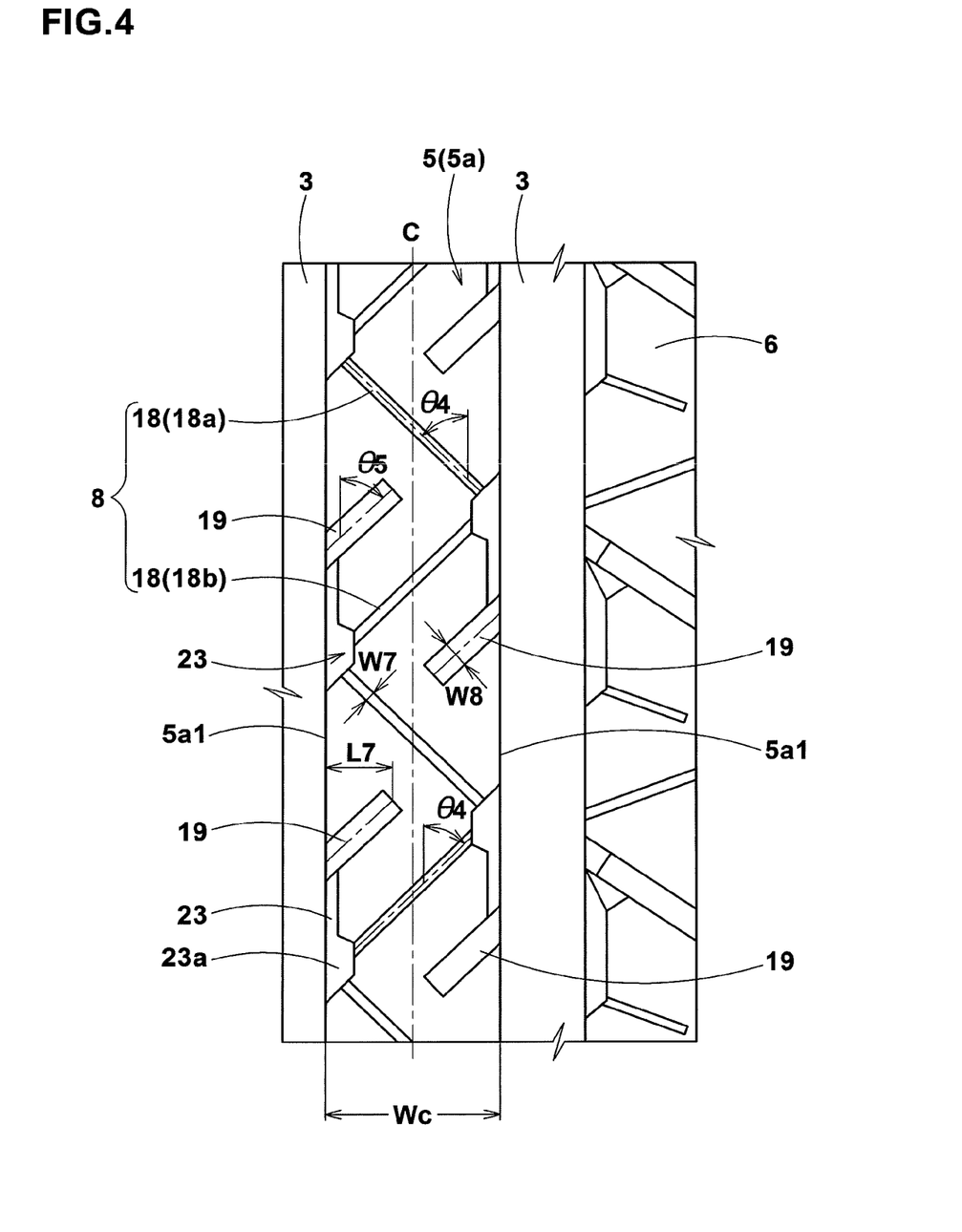
FIG. 4 is an enlarged view of a part of the crown block row shown in FIG. 1.

As shown in FIG. 4, it is preferable that the crown axial grooves 8 are crown sipes 18 whose width w7 is 0.3 to 1.6 mm. In this embodiment, the crown sipes 18 are first crown sipes 18a and second crown sipes 18b which are alternately arranged in the tire circumferential direction.

The first crown sipes 18a extend straight between the crown main grooves 3 while inclining to one circumferential direction.

The second crown sipes 18b extend straight between the crown main grooves 3 while inclining to the other circumferential direction.

By the first crown sipes 18a and second crown sipes 18b, crown blocks 5a having an isosceles triangular shape are divided. Since the crown axial grooves 8 have relatively narrow widths, it is possible to minimize the decrease in the rigidity of the crown land region 5 subjected to a large ground pressure during straight running. Accordingly, the steering stability on dry pavement can be maintained.

For that purpose, it is preferable that the width W7 of the crown sipes 18 is decreased as far as possible. Therefore, the width w7 is more preferably not less than 0.4 mm, but not more than 1.2 mm.

In order to derive the above mentioned effects, the depth of the crown sipe 18 is preferably set in a range of not less than 20%, more preferably not less than 30%, but not more than 90%, more preferably not more than 80% of the depth of the crown main groove 3.

In order to effectively utilize the circumferential component of the edges, the angle θ4 of the crown sipes 18 with respect to the tire circumferential direction is preferably set in a range of not less than 10 degrees, more preferably not less than 20 degrees, but not more than 80 degrees, more preferably not more than 70 degrees.

The angle θ4 of the first crown sipes 18a is set to be the same value as the angle θ4 of the second crown sipes 18b in order to even the rigidity of the crown blocks 5a.

It is also preferable that the crown block 5a is provided with a crown slot 19 extending straight from the crown main groove 3 toward the tire equator c to further increase the edges and thereby to improve on-the-snow performance.

If the crown slot 19 is too large, the rigidity of the crown block 5a decreases.

Therefore, the width w8 of the crown slot 19 is preferably not less than 1.0 mm, more preferably not less than 1.5 mm, but not more than 5.0 mm, more preferably not more than 4.0 mm.

The depth of the crown slot 19 is preferably not less than 1.0 mm, more preferably not less than 3.0 mm, but not more than 8.0 mm, more preferably not more than 7.0 mm.

In order to prevent the rigidity of the crown block 5a from decreasing, it is preferable that the crown slots 19 on all of the crown blocks 5a are substantially parallel with the first or second crown sipes.

The difference |θ5-θ4| between the angle θ5 of the crown slots 19 and the above-mentioned angle θ4 is preferably not more than 15 degrees, more preferably 0 degrees.

The crown block 5a may be provided with a crown slot 19 and a crown cut 23. The crown cut 23 has a narrow width and extends between the crown slot 19 and the crown axial groove 8 extending parallel with the crown slot 19.

By the crown cuts 23, the axially outer edge 5a1 of the crown block 5a becomes uneven, and the snow grip performance can be improved although the crown main grooves 3 are a straight groove.

Figure 5:
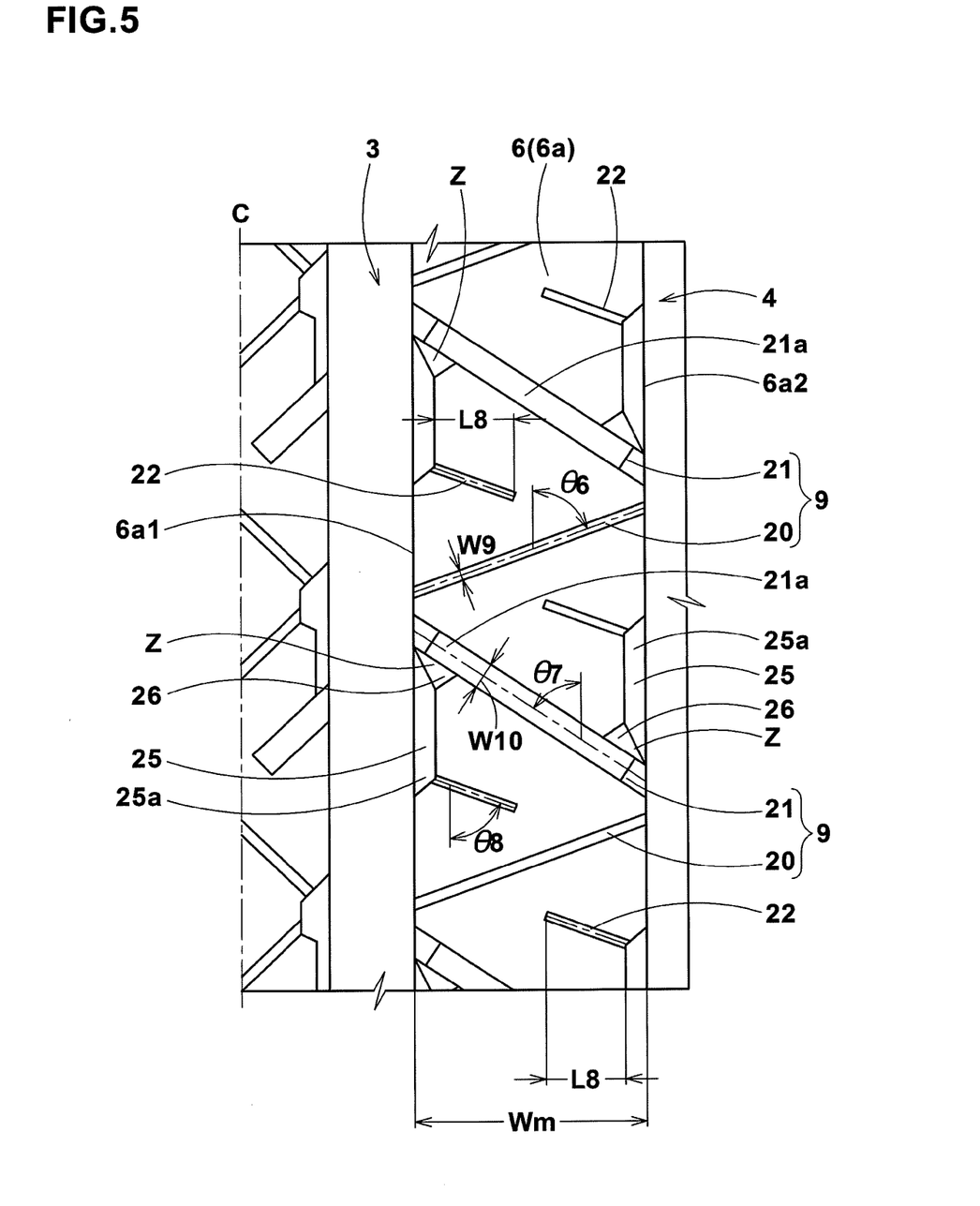
FIG. 5 is an enlarged view of a part of the middle block row shown in FIG. 1.

During straight running, the ground pressure in the middle land regions 6 becomes smaller than that in the crown land region 5, therefore, it is permissible that the rigidity of the middle blocks 6a is somewhat lower than the rigidity of the crown blocks 5a. It is therefore, preferable that, as shown in FIG. 5, the middle axial grooves 9 include first middle sipes 20 having a narrow width w9 as well as middle narrow grooves 21 having a wider width w10. The width w9 of the first middle sipes 20 is not less than 0.3 mm, preferably not less than 0.4 mm, but not more than 1.6 mm, preferably not more than 1.0 mm. The depth of the first middle sipes 20 is not less than 1.0 mm, preferably not less than 2.0 mm, but not more than 7.0 mm, preferably not more than 6.0 mm.

The width w10 of the middle narrow grooves 21 is more than 1.6 mm, preferably not less than 1.8 mm, but not more than 5.0 mm, preferably not more than 4.5 mm.

The depth D7 of the middle narrow grooves 21 is not less than 1.0 mm, preferably not less than 2.0 mm, but not more than 8.0 mm, preferably not more than 7.0 mm.

As a result, by the wider middle narrow grooves 21, on-the-snow performance such as snow grip can be improved, while retaining the apparent rigidity of the middle blocks 6a as a whole owing to the narrow first middle sipes 20.

In this embodiment, as shown in FIG. 5, the first middle sipes 20 and middle narrow grooves 21 are straight.

The angle θ6 of the first middle sipes 20 with respect to the tire circumferential direction is preferably set in a range of not less than 20 degrees, more preferably not less than 30 degrees, but not more than 90 degrees, more preferably not more than 80 degrees.

The angle θ7 of the middle narrow grooves 21 with respect to the tire circumferential direction is preferably set in a range of not less than 10 degrees, more preferably not less than 20 degrees, but not more than 90 degrees, more preferably not more than 80 degrees.

If the angle θ6 becomes less than 20 degrees, the lateral stiffness (rigidity) of the middle blocks 6a becomes insufficient.

If the angle θ7 becomes less than 10 degrees, on-the-snow performance such traction and breaking force is deteriorated.

It is preferable that the angles θ6 and θ7 are smaller than the angle θ4 of the first and second crown sipes 18a and 18b. Thereby, the middle blocks 6a subjected to larger ground pressure during cornering, can be increased in the lateral stiffness (rigidity) relatively to the crown blocks 5a, and the steering stability can be improved.

Further, each of the middle narrow grooves 21 may be provided in a central portion with a middle tie bar 21a rising from the groove bottom to connect the adjacent blocks each other.

Further, it is preferable that each of the middle blocks 6a is provided with a second middle sipe 22 extending straight from the crown main groove 3 or shoulder main groove 4 and terminating within the middle block 6a in order to further increase the edge component of the middle block 6a and thereby further improve on-the-snow performance.

The axial length L8 of the second middle sipe 22 is preferably set in a range of not less than 10%, more preferably not less than 20%, but not more than 80%, more preferably not more than 70% of the axial width wm of the middle block 6a. The depth of the second middle sipe 22 is preferably set in a range of not less than 1.0 mm, more preferably not less than 2.0 mm, but not more than 8.0 mm, more preferably not more than 7.0 mm. If the axial length L8 becomes more than 80%, it becomes difficult to maintain the necessary rigidity of the middle block 6a.

In view of the rigidity of the middle block 6a, it is preferable that the inclination of the angle θ8 of the second middle sipes 22 and the inclination of the angle θ7 of the middle narrow groove 21 are toward the same circumferential direction. Preferably, the difference |θ7-θ8| between the angle θ7 and the angle θ8 is not more than 30 degrees, more preferably not more than 20 degrees.

One of the axially inner edge 6a1 and axially outer edge 6a2 of the middle block 6a which is longer than the other is partially provided with an edge cut 25. In this embodiment, as shown in FIG. 5, the edge cut 25 extends from the opened end of the second middle sipe 22 to the opened end of the middle narrow groove 21 so that the opened end of the second middle sipe 22 shifts toward the inside of the middle block 6a and thereby partial wear and chip-off starting therefrom can be effectively prevented.

In this embodiment, further, the corner Z of the middle block 6a between the middle narrow groove 21 and the crown main groove 3 is provided with a chamfer 26 which has a triangular shape in the plan view in order to prevent partial wear and chip-off starting from the corner.

Comparison Tests

Test tires of size 185/60R15 (rim size 15X6JJ) for passenger cars having the tread pattern shown in FIG. 1 and the tread pattern shown in FIG. 5 were prepared and tested as follows. The test tires had the same specifications except for the specifications shown in Table 1.

Common specifications are as follows;
Tread TW: 152 mm
<Crown Main Groove>
  width W1: 5.4% of TW
  depth D1: 8.0 mm
  position L1: 8.0% of TW
<Shoulder Main Groove>
  width W2: 5.1% of TW
  depth D2: 8.0 mm
  position L2: 27.6% of TW
<Shoulder Axial Groove>
  width W3: 2.4 to 2.6% of TW
  angle θ1: 78 to 88 degrees
  depth D3: 75% of D2
<Shoulder Sipes>
  width W6: 0.8 mm
  length L4: 90% of Ws1
  angle θ3: 80 to 88 degrees
<Groove-Bottom Sipe>
  width w5: 33% of w4
  depth D5: 185% of D4
<Crown Sipes>
  width w7: 1.0 mm
  depth: 5.7 mm
  angle θ4: 40 to 50 degrees
<First Middle Sipes>
  width w9: 1.0 mm
  depth: 5.7 mm
  angle θ6: 20 to 30 degrees
<Middle Narrow Groove>
  width w10: 2.0 to 3.0 mm
  depth D7: 3.7 to 5.8 mm
  angle θ7: 50 to 60 degrees
<Second Middle Sipes>
  width w11: 0.8 mm
  depth: 3.7 to 5.7 mm
  angle θ8: 67 to 75 degrees In the test, a Japanese 1400cc FF car provided on the four wheels with test tires (tire pressure 230 kPa) was run on a drying asphalt road and snowy road in a tire test course. The steering stability was evaluated by the test driver, based on the steering response, rigidity and road grip during cornering.

Further, on the snowy road, the braking force and driving force were evaluated.

The results are shown in Table 1 by an index based on the comparative tire Ref. 1 being 100, wherein the larger value is better.

TABLE 1

| Tire | Con. | Ref. 1 | Ex. 1 | Ex. 2 | Ex. 3 | Ref. 2 | Ex. 4 | Ex. 5 | Ref. 3 | Ex. 6 | Ex. 7 |
|---|---|---|---|---|---|---|---|---|---|---|---|
| tread pattern (Fig. No.) | 7 | 1 | 1 | 1 | 1 | 1 | 1 | 1 | 1 | 1 | 1 |
| shoulder secondary groove | | | | | | | | | | | |
| angle θ2 (degrees) | — | 0 | 0 | 0 | 0 | 0 | 5 | 10 | 20 | 0 | 0 |
| depth D4 (mm) | — | 2 | 2 | 2 | 2 | 2 | 2 | 2 | 2 | 0.5 | 1 |
| D4/W4 (%) | — | 80 | 80 | 80 | 80 | 80 | 80 | 80 | 80 | 80 | 80 |
| distance L3 (mm) | — | 2 | 8 | 5 | 11 | 17 | 8 | 13 | 13 | 13 | 13 |
| distance L5 (mm) | — | 5 | 5 | 5 | 5 | 5 | 5 | 5 | 5 | 5 | 5 |
| Steering stability | | | | | | | | | | | |
| on snowy road | 100 | 100 | 130 | 110 | 110 | 110 | 110 | 105 | 80 | 105 | 110 |
| on dry pavement | 100 | 100 | 100 | 100 | 100 | 90 | 100 | 100 | 100 | 105 | 110 |
| Snow performance | | | | | | | | | | | |
| braking force | 100 | 100 | 100 | 100 | 100 | 100 | 105 | 108 | 110 | 100 | 100 |
| driving force | 100 | 100 | 100 | 100 | 100 | 100 | 105 | 108 | 110 | 100 | 100 |

| Tire | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| tread pattern (Fig. No.) | 1 | 1 | 1 | 1 | 1 | 1 | 1 | 1 | 1 |
| shoulder secondary groove | | | | | | | | | |
| angle θ2 (degrees) | 0 | 0 | 0 | 0 | 0 | 0 | 0 | 0 | 0 |
| depth D4 (mm) | 5 | 7.5 | 2 | 2 | 2 | 2 | 2 | 2 | 2 |

TABLE 1-continued

| | | | | | | | | | |
|---|---|---|---|---|---|---|---|---|---|
| D4/W4 (%) | 80 | 80 | 80 | 80 | 80 | 80 | 30 | 50 | 70 |
| distance L3 (mm) | 13 | 13 | 13 | 13 | 13 | 13 | 13 | 13 | 13 |
| distance L5 (mm) | 5 | 5 | 1 | 2 | 7 | 9 | 5 | 5 | 5 |
| Steering stability | | | | | | | | | |
| on snowy road | 130 | 130 | 130 | 110 | 110 | 100 | 110 | 120 | 110 |
| on dry pavement | 80 | 75 | 80 | 95 | 105 | 105 | 100 | 100 | 100 |
| Snow performance | | | | | | | | | |
| braking force | 100 | 100 | 100 | 100 | 100 | 100 | 100 | 100 | 100 |
| driving force | 100 | 100 | 100 | 100 | 100 | 100 | 100 | 100 | 100 |

The invention claimed is

1. A pneumatic tire comprising
a tread portion provided on each side of the tire equator with an axially inner crown main groove and an axially outer shoulder main groove which extend continuously in the tire circumferential direction so that the tread portion is divided into a crown land region between the crown main grooves, a pair of middle land regions between the crown main grooves and the shoulder main grooves, and a pair of shoulder land regions between the shoulder main grooves and tread edges, wherein
the crown land region is provided with crown axial grooves which are narrow grooves and/or sipes extending across the entire width of the crown land region and arranged in a zigzag fashion so as to divide the crown land region into a plurality of crown blocks having triangular configurations,
the middle land regions are each provided with middle axial grooves which are narrow grooves and/or sipes extending across the entire width of the middle land region and arranged in a zigzag fashion so as to divide the middle land region into a plurality of middle blocks having triangular configurations,
the shoulder land regions are each provided with shoulder axial grooves extending across the entire width of the shoulder land region at an angle of not less than 70 degrees with respect to the tire circumferential direction so as to divide the shoulder land region into a plurality of shoulder blocks,
the shoulder blocks are each provided with a shoulder secondary groove extending at an angle of not more than 10 degrees with respect to the tire circumferential direction and disposed at a distance of 3 to 15 mm axially outward from the shoulder main groove so as to subdivide the shoulder block into an axially inner part and an axially outer part, and
the outer part is provided with shoulder sipes extending at an angle of not less than 70 degrees with respect to the circumferential direction, and
wherein:
said shoulder secondary groove extends straight,
said shoulder secondary groove is provided in the bottom thereof with a groove-bottom sipe extending along the shoulder secondary groove,
the groove-bottom sipe has a width smaller than the width of the shoulder secondary groove,
one end of the groove-bottom sipe is a closed end located at a distance of 1.0 to 8 0 mm from one circumferential end of the shoulder secondary groove, and the other end of the same groove-bottom sipe is a closed end located at a distance of 1.0 to 8.0 mm from the other circumferential end of the same shoulder secondary groove,
between the axially inner parts of the shoulder blocks, a tie bar rising from the bottom of the shoulder axial groove therebetween is disposed,
the axial length L6 of the tie bar is not less than 30% and not more than 100% of the axial width Ws2 of the axially inner parts, and
said shoulder sipes in the axially outer part of the shoulder block extend from the tread edge toward the shoulder secondary groove and terminate without reaching the shoulder secondary groove.

2. the pneumatic tire according to claim 1, wherein
the depth of the shoulder secondary groove is 0.5 to 7.0 mm.

3. The pneumatic tire according to claim 2, wherein
the width of the shoulder secondary groove is more than its depth.

4. The pneumatic tire according to claim 2, wherein
the crown axial grooves are sipes having a width of from 0.3 to 1.6 mm.

5. The pneumatic tire according to claim 2, wherein
the crown blocks are each provided with a crown slot extending from the crown main groove toward the tire equator and terminating within the crown block.

6. The pneumatic tire according to claim 1, wherein
the width of the shoulder secondary groove is more than its depth.

7. The pneumatic tire according to claim 6, wherein
the crown axial grooves are sipes having a width of from 0.3 to 1.6 mm.

8. The pneumatic tire according to claim 1, wherein
the crown axial grooves are sipes having a width of from 0.3 to 1.6 mm.

9. The pneumatic tire according to claim 1, wherein
the crown blocks are each provided with a crown slot extending from the crown main groove toward the tire equator and terminating within the crown block.

10. The pneumatic tire according to claim 1, wherein
the middle axial grooves are first middle sipes having a width of from 0.3 to 1.6 mm and middle narrow grooves having a width more than 1.6 mm and not more than 7.0 mm, and
the first middle sipes and the middle narrow grooves are arranged alternately in the tire circumferential direction.

11. The pneumatic tire according to claim 1, wherein
the middle blocks are each provided with a second middle sipe extending from the crown main groove or the shoulder main groove and terminating within the middle block.

* * * * *